Dec. 12, 1933.  A. J. B. MARSAT  1,938,600
HEADLIGHT FOR MOTOR VEHICLES
Original Filed Jan. 21, 1931   2 Sheets-Sheet 1

Inventor
Antoine Jean Baptiste Marsat

By
Attorney

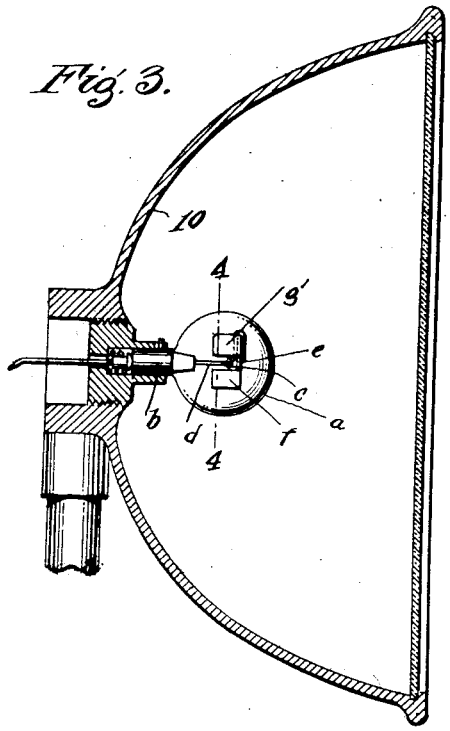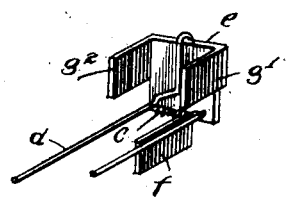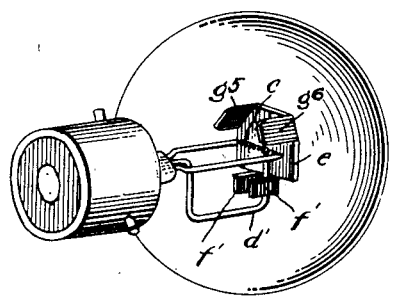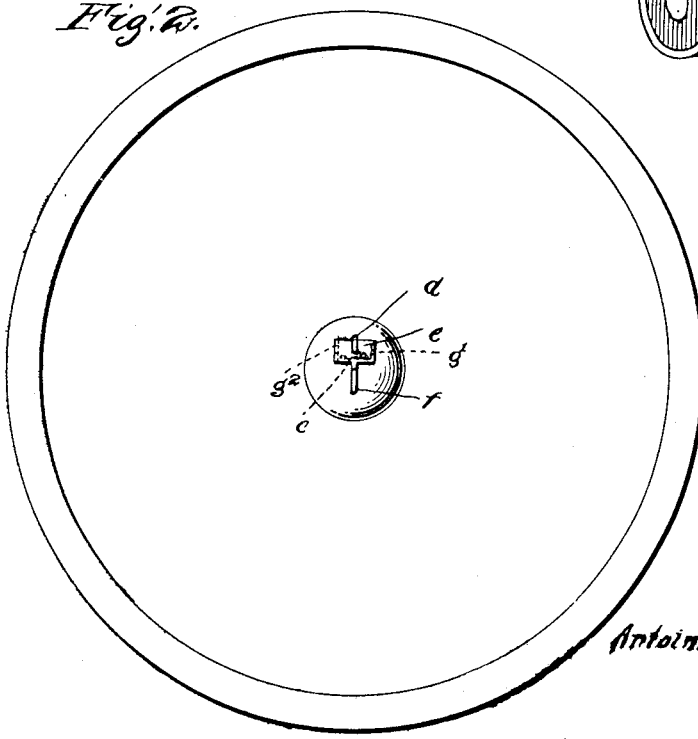

Patented Dec. 12, 1933

1,938,600

UNITED STATES PATENT OFFICE 1,938,600

HEADLIGHT FOR MOTOR VEHICLES

Antoine Jean Baptiste Marsat, Verrieres-Le-Buisson, France

Application January 21, 1931, Serial No. 510,231, and in France January 21, 1930. Renewed March 2, 1933

6 Claims. (Cl. 240—48.6)

The present invention has for its object to obviate the blinding effects of headlights employed for motor and other vehicles, and it also prevents the direct view of the filaments. It has further for its object to suppress the upwardly directed blinding rays.

It has also for its object to reduce to a minimum the effective lighting of the foreground, and to afford the maximum intensity of the light in a direction parallel with the road.

It has further for its object to vary the intensity of the light beam in proportion to the distance between the point of emission of the beam and the point of the ground lighted by this beam.

It has further for its object to enlarge the light beam in its most intense part, so as to assure the lighting of the road in the curves.

Various headlights permitting to obtain the aforesaid ends offer the features disclosed in the following description, and in the accompanying claims at the end of the said description.

Headlights according to the invention are shown by way of example in the accompanying drawings in which:

Figure 2 is a front view of a headlight according to the invention.

Figure 3 is a lengthwise section of this headlight with a side view of the electric lamp.

Figure 5 is a perspective view of the arrangement of screens supposing the observer to be stationed at the side of the lamp base and looking from the side of the screens.

Figure 8 is a perspective view of a lamp showing another form of the invention.

The section on a plane normal to the road and to the path of the vehicle, of a beam corresponding to the aforesaid objects, has a maximum lighting region of rectangular shape. It is thus natural that one may use an illuminant having the same form, that is, in the case of an electric lamp, a helical filament whose axis is horizontal and is perpendicular to the focal axis.

Figure 1:
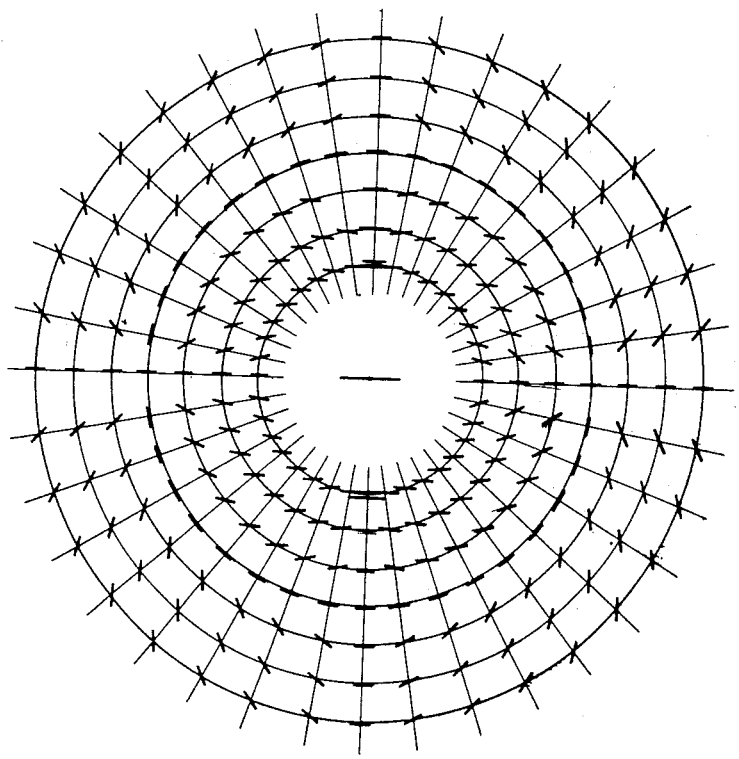
Figure 1 is a diagram showing the lighting obtained by a parabolic reflector and an electric lamp having a helical filament whose axis is horizontal and is perpendicular to the focal axis.
Figure 4:
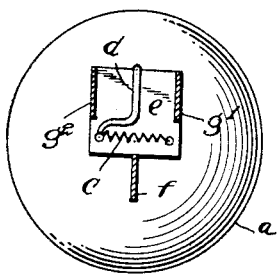
Figure 4 is a cross section of the lamp on the line 4—4 of Figure 3.

This method of proceeding does not permit, however, to obtain the desired result. In fact, each small element of the surface of the reflector sends out a flat beam whose direction is quite variable. Figure 1 shows the projection of these elementary beams, which together form the composite beam of the headlight, taken at a great number of points determined by the intersection of 7 parallels and 18 meridians of the surface of the reflector. At a great distance, the size of each elementary beam is great with reference to the size of the reflector, which determines the spacing of the centers of the several elementary beams whose combination forms the somewhat flattened tapered composite beam. One can admit without great error that all the centers coincide.

An examination of Figure 1 shows that one can obtain a beam corresponding to the aforesaid objects if it is possible to eliminate from each beam the part situated above the center.

The headlight according to the invention permits to obtain such results. To this end, the headlight shown in Figures 2 to 5 comprises a lamp bulb $a$ provided with a lamp base $b$. In the interior is a filament $c$ consisting of a helical wire perpendicular to the axis of the reflector 10 in which the lamp is mounted as usual. Said filament is mounted on a rod $d$ which serves as the anode and is extended so as to support a screen $e$ preventing the direct vision of the filament. Or a separate rod $d'$ is used to support the screen $e$ as in Figure 8.

A lower screen $f$ is placed vertically midway on the length of the filament, and two upper screens $g^1$ and $g^2$, also vertical, have the lateral disposition at each end of the filament.

These three screens are secured to the screen $e$ which supports them. The screen $f$ below the filament serves to conceal the part of the filament which is on the other side. In practice, the screen cannot make contact with the filament; at certain points of the reflector at which the elementary beam is, in its width, almost parallel with the road, the beam is almost entirely preserved. At the top, the two screens $g^1$—$g^2$ situated above the filament, near its ends and on the outside, suppress the part of the light which proceeds upwardly, and which would be prejudicial.

The said headlight described with reference to Figures 2 to 5 can be variously modified.

Figure 7:
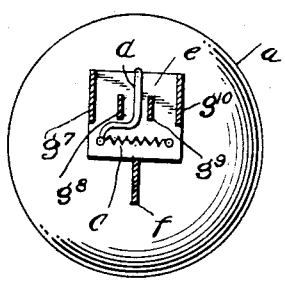
Figures 6 and 7 are two front views of two other headlights according to two modifications of the invention.
Figure 6:
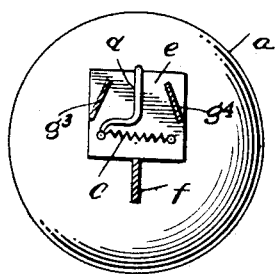

Thus it is feasible as shown in Figure 6 or 8 to incline the screens, as at $g^3$—$g^4$ or $g^5$—$g^6$ respectively, from the filament $c$, and this allows of screening off the blinding parts of the beam without using very high screens. It is further possible to mount several screens $g^7$—$g^8$—$g^9$—$g^{10}$ upon the whole length of the filament $c$, as shown in Figure 7, and this will allow the size of the said screens to be reduced. Also several screens $f^1 f^1$ may be used below the filament as in Figure 8. In all cases, this offers the advantage of being able to mount the upper screens in all positions desired, upon a screen such as the screen $e$, and this, while forming a support for the upper screens and for the lower screen or screens as the case may be, will permit the shutting off of the filament from direct view and thus to prevent all blinding effects.

The screens are best made of nickel from which all gas has been removed.

To recapitulate, I construct headlights for motor or other vehicles which correspond to the conditions required of such vehicle apparatus:

The headlights thus constructed will not send any blinding light upwardly, due to the presence of the upper and lower screens, thus preventing all blinding of drivers of vehicles coming in the other direction.

On the other hand, the lighting of the foreground is but small, and this avoids all blinding of the driver of the vehicle upon which the headlight is mounted. However, the maximum luminous intensity of the beam is in the direction parallel with the road, whilst the intensity diminishes very rapidly upon the more inclined directions, according as they meet the ground at a less distance from the vehicle.

What is claimed is:

1. In a headlight for motor vehicles, reflector, an electric lamp having a helical filament located substantially at the focus of the reflector in a horizontal position and at right angles to the axis of the reflector, a screen positioned in front of the filament and substantially parallel thereto, and upper and lower screens positioned respectively adjacent the ends of and between the ends of said filament and arranged respectively above and below the same and transversely thereof.

2. In a headlight for motor vehicles, a reflector, an electric lamp having a helical filament arranged substantially at the focus of the reflector and positions horizontally and perpendicular to the focal axis of the reflector, a screen positioned vertically in front of the filament and parallel thereto and cutting off the filament from direct view, a lower vertical screen arranged substantially at right angles to the filament and below the same and carried by the first said screen, and upper screens arranged above the filament and beyond the ends thereof and at right angles thereto and carried by the first said screen.

3. In a headlight for motor vehicles, a reflector, an electric lamp having a filament arranged at the focus of the reflector and disposed horizontally and at right angles to the axis of the reflector, a screen positioned in front of and parallel to the filament, a lower screen positioned substantially at the middle of and below the filament and arranged at right angles thereto, and upper screens mounted above the filament adjacent the ends thereof and arranged substantially at right angles thereto.

4. In a headlight for motor vehicles, a reflector, an electric lamp having a helical filament arranged at the focus of the reflector and positioned horizontally and at right angles to the axis of the reflector, a screen positioned in front of the filament and cutting off said filament from direct view, screening means for the filament carried by the screen and positioned below the filament, and upper screens arranged substantially at the ends of the filament and above the same and inclined toward one another and positioned transversely of the filament.

5. In a headlight for motor vehicles, a reflector, an electric lamp having a filament arranged substantially at the focus of the reflector and at right angles to its axis and horizontally, a screen positioned in front of the filament and adapted to cut the filament off from direct view, a plurality of screens arranged above the filament and projecting at right angles thereto, and means for screening the light positioned below and between the ends of the filament and at right angles thereto.

6. In a headlight for motor vehicles, a reflector, an electric lamp having a helical filament arranged substantially horizontally and at right angles to the axis of the projector and situated at the focus thereof, a screen arranged vertically in front of the filament and parallel thereto, a lower screen arranged vertically below the filament and at right angles thereto, and upper screens arranged above the filament and at right angles thereto and inclined toward each other.

ANTOINE JEAN BAPTISTE MARSAT.